(12) United States Patent
Kamishima et al.

(10) Patent No.: US 6,219,097 B1
(45) Date of Patent: Apr. 17, 2001

(54) IMAGE PICKUP WITH EXPANDED DYNAMIC RANGE WHERE THE FIRST EXPOSURE IS ADJUSTABLE AND SECOND EXPOSURE IS PREDETERMINED

(75) Inventors: Gakuji Kamishima, Hino; Osamu Inagaki; Minoru Kakinuma, both of Hachioji; Hidetoshi Fukuda, Yokohama, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/850,181

(22) Filed: May 2, 1997

(30) Foreign Application Priority Data

May 8, 1996 (JP) ..................... 8-113781
Nov. 21, 1996 (JP) ..................... 8-310963

(51) Int. Cl.⁷ ............... H04N 3/14; H04N 5/238; G03B 7/00
(52) U.S. Cl. ............... 348/297; 348/362; 348/364
(58) Field of Search ................... 348/229, 230, 348/296, 362, 363, 364, 365, 297, 298, 299

(56) References Cited

U.S. PATENT DOCUMENTS

| | | | |
|---|---|---|---|
| 4,471,228 | * 9/1984 | Nishizawa et al. | 250/578 |
| 4,544,848 | * 10/1985 | Kawasaki et al. | 250/578 |
| 5,038,214 | * 8/1991 | Miida | 358/213.11 |
| 5,264,940 | * 11/1993 | Komiya et al. | 358/228 |
| 5,264,944 | * 11/1993 | Takemura | 358/335 |
| 5,455,621 | * 10/1995 | Morimura | 348/229 |

FOREIGN PATENT DOCUMENTS

| | | | |
|---|---|---|---|
| 57-39673 | 3/1982 | (JP) | H04N/5/30 |
| 63-98286 | * 4/1988 | (JP) | H04N/5/335 |
| 5-167889 | 7/1993 | (JP) | H04N/5/20 |
| 6-319149 | 11/1994 | (JP) | H04N/9/64 |
| 7-75026 | 3/1995 | (JP) | H04N/5/335 |

* cited by examiner

*Primary Examiner*—Wendy Garber
*Assistant Examiner*—Alicia M Harrington
(74) *Attorney, Agent, or Firm*—Frishauf, Holtz, Goodman, Langer & Chick, P.C.

(57) ABSTRACT

In an image pickup apparatus, a level of an output signal from an image pickup device is detected. A first quantity of exposure of the image pickup device is determined such that a maximum value of the output signal from the image pickup device does not exceed a saturation level. And a first image signal picked up by the image pickup device with the first quantity of exposure is synthesized with at least one second image signal picked up with a second quantity of exposure which is larger than the first quantity of exposure.

5 Claims, 12 Drawing Sheets

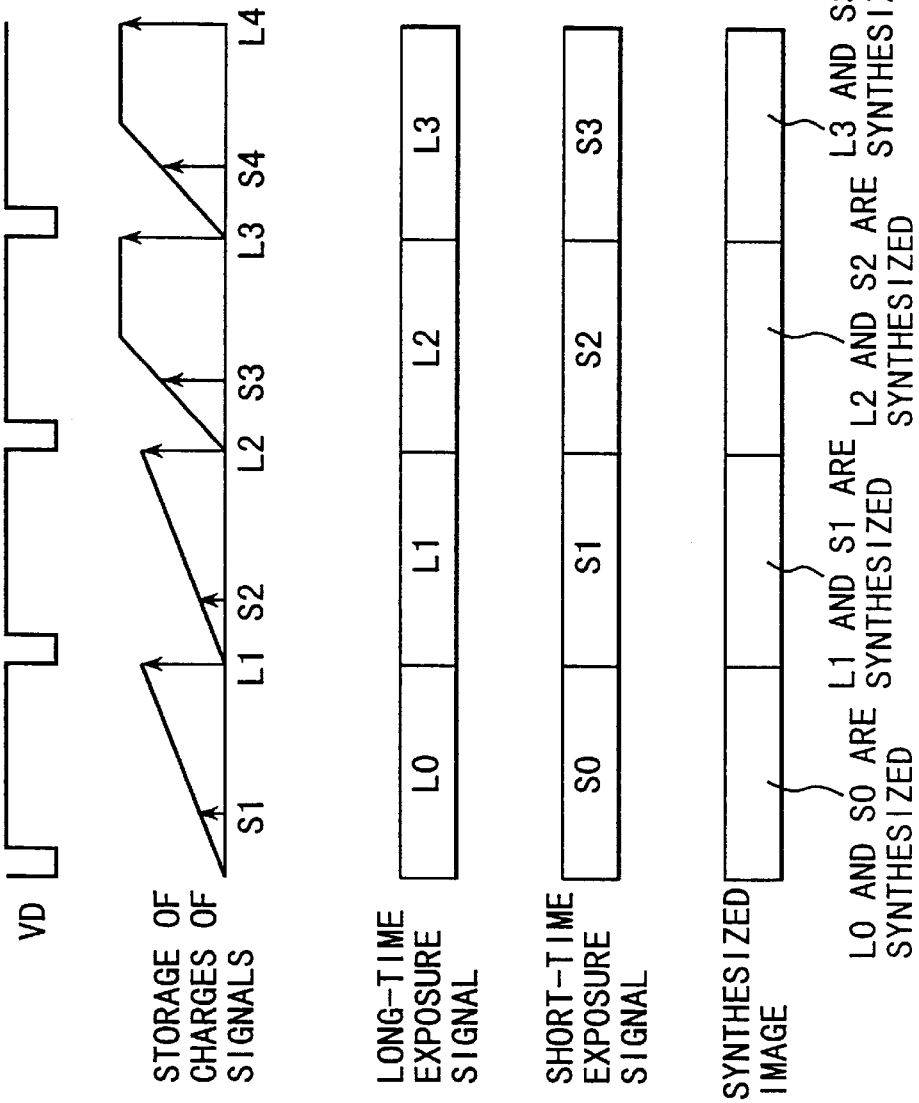

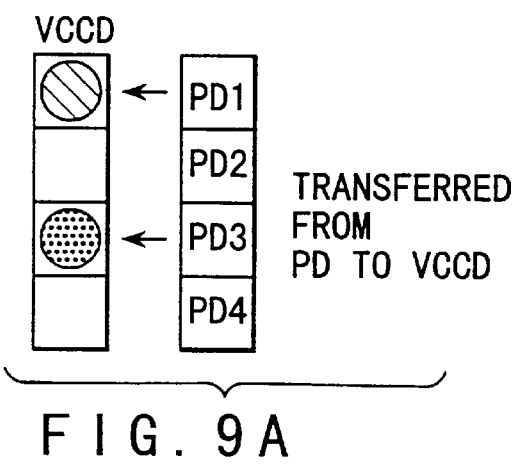
F I G. 9 A
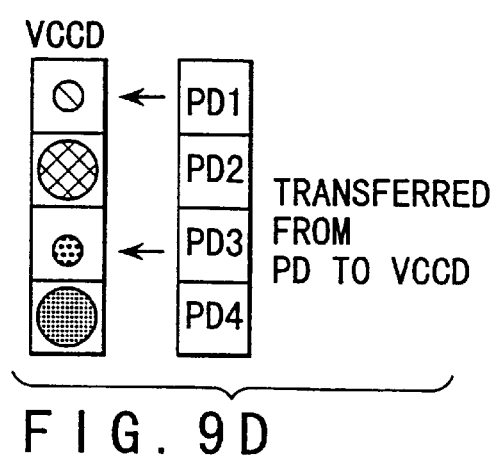
F I G. 9 D
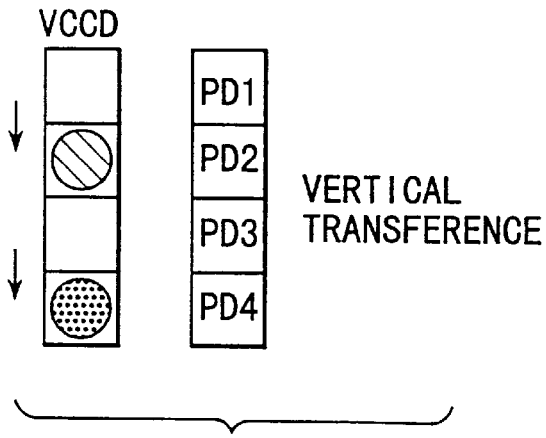
F I G. 9 B
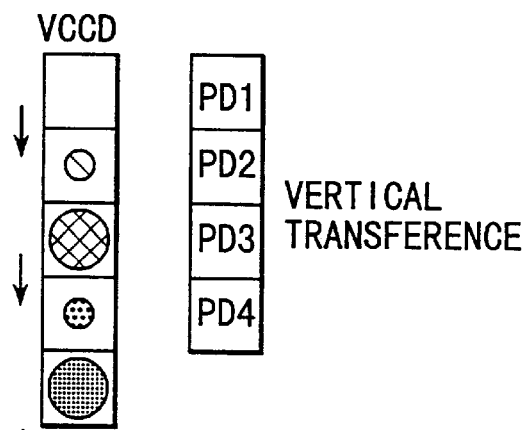
F I G. 9 E
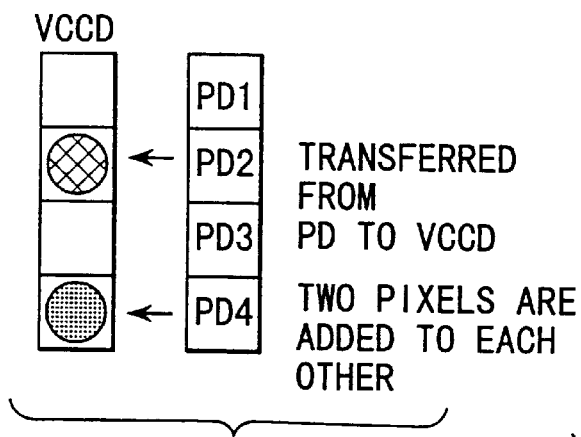
F I G. 9 C
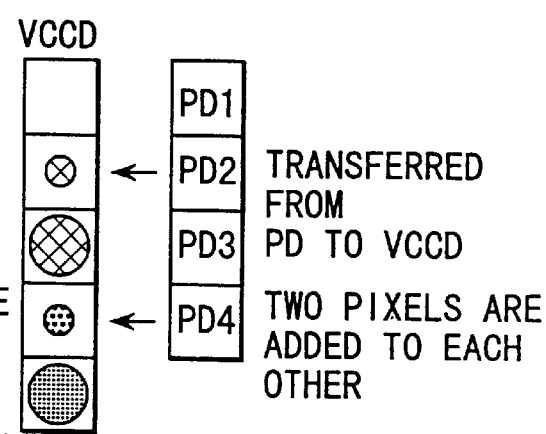
F I G. 9 F

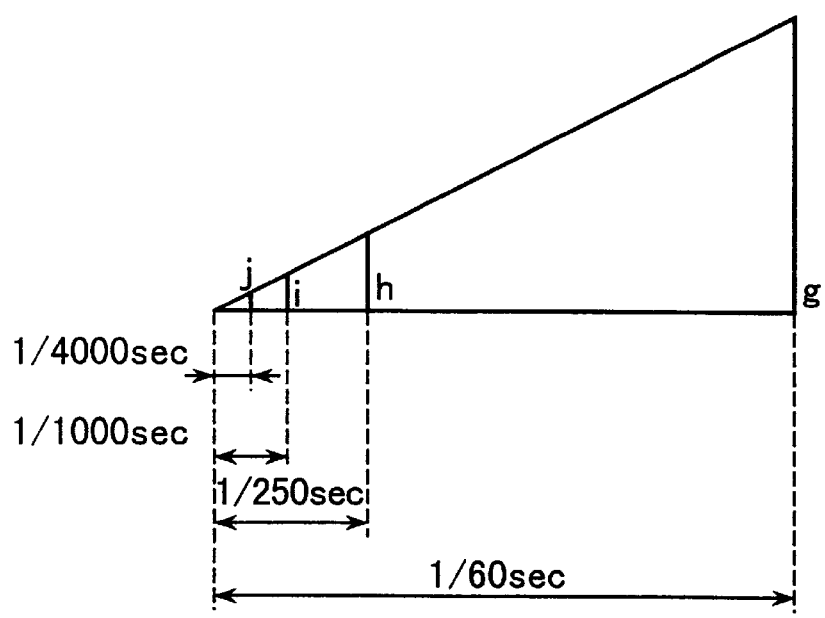
F I G. 13
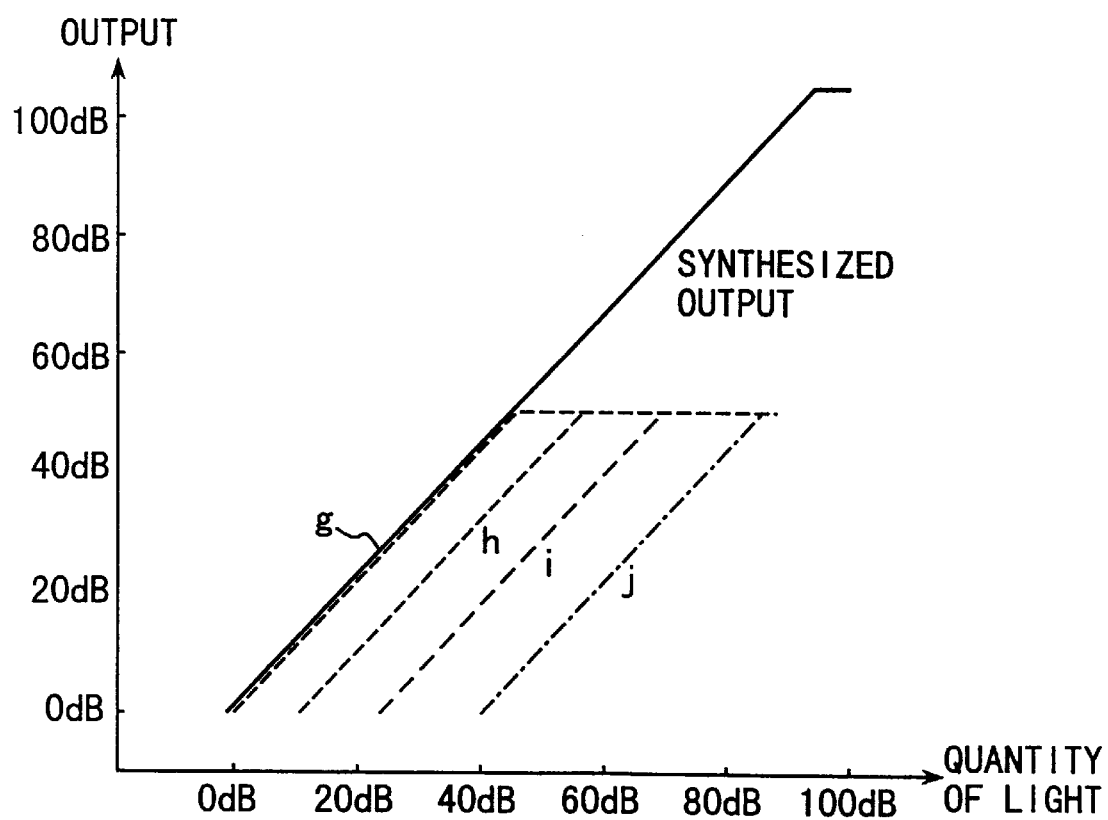
F I G. 14

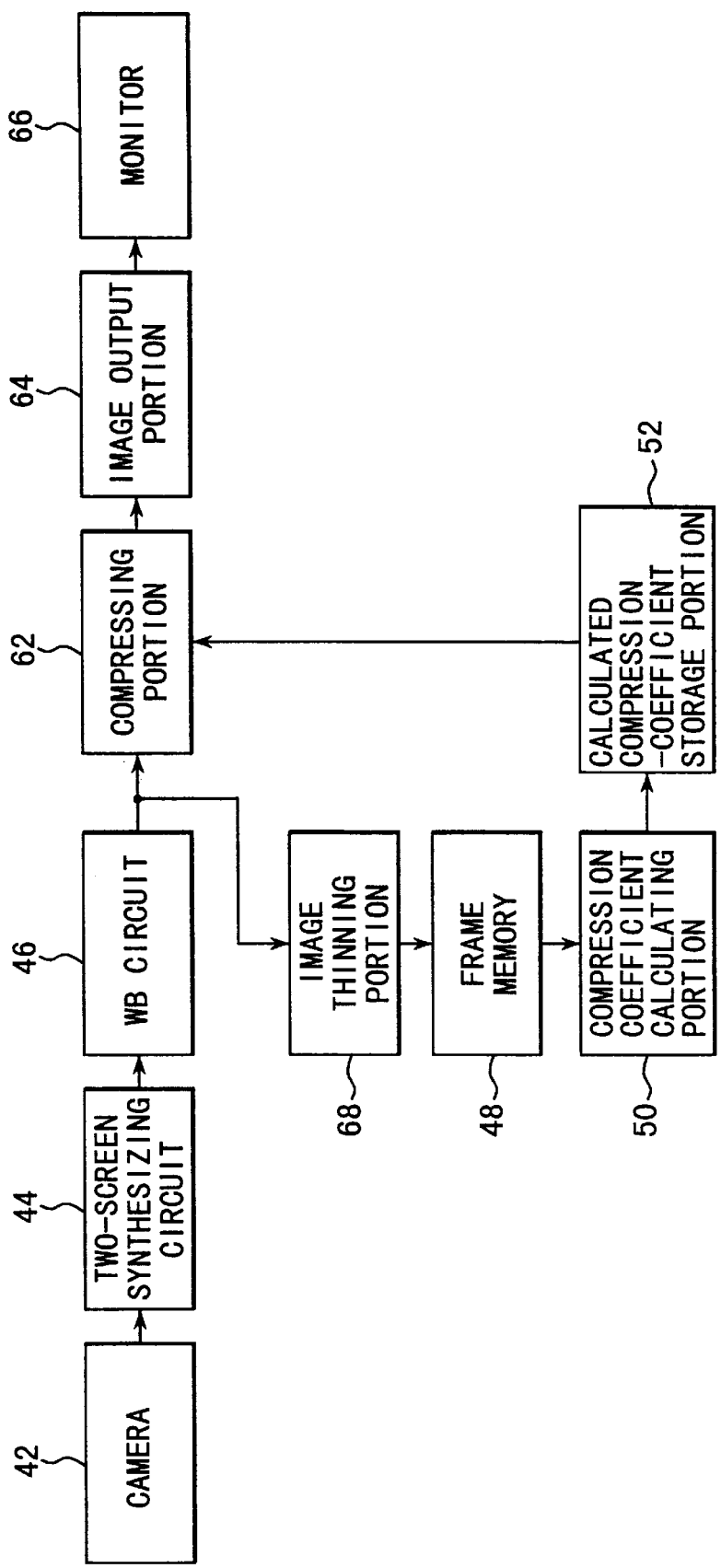
F I G. 18

IMAGE PICKUP WITH EXPANDED DYNAMIC RANGE WHERE THE FIRST EXPOSURE IS ADJUSTABLE AND SECOND EXPOSURE IS PREDETERMINED

BACKGROUND OF THE INVENTION

The present invention relates to an image processing apparatus, and more particularly to an image processing apparatus capable of outputting an image having a wide dynamic range by using a solid state image device to synthesize and compress images of two or more screens having different quantities of exposure.

Hitherto, the upper limit for an image pickup dynamic range (a luminance range in which an image can be pick up) of an image pickup device, such as a television camera, is determined in accordance with the saturation level of the image pickup device. On the other hand, the lower limit of the same is determined in accordance with the noise level of the image pickup device and its peripheral circuits. The dynamic range of a usual image pickup device is about 50 dB to about 60 dB, while that of a TV (television) monitor or the like is about 45 dB. On the other hand, the dynamic range of a usual object is wider than the above-mentioned values and thus the same reaches 80 dB to 100 dB. Therefore, if a usual object is picked up by the image pickup device and the image of the object is displayed on a monitor or the like, a bright portion and a dark portion of an image having a contrast cannot simultaneously be displayed. Since the image pickup dynamic range is usually smaller than the luminance range for an object, a bright portion is whitened excessively and a low bright portion is blackened unsatisfactorily.

Accordingly, if a usual object is picked up by the image pickup device and the image of the object is displayed on a monitor or the like, a bright portion and a dark portion of an image having a contrast cannot simultaneously be displayed. In order to solve this problem, techniques have been disclosed in, for example, Jpn. Pat. Appln. KOKAI Publication No. 5-167889 and Jpn. Pat. Appln. KOKAI Publication No. 6-319149.

The apparatus disclosed in Jpn. Pat. Appln. KOKAI Publication No. 6-319149 has a structure such that the image of an object allowed to pass through an image pickup optical system is divided into two directions by a half mirror or the like. Then, a filter or the like is used to obtain, from the divided image signals, an image signal in which a dark portion of the object is deformed and a bright portion is not saturated and thus picked up satisfactorily is output and another image signal in which a bright portion is saturated and a dark portion is not deformed and thus picked up satisfactorily is obtained. The two image signals are synthesized so that an image signal having information from the dark portion to the bright portion can be obtained. The image signal is logarithmically compressed, and then subjected to a filtering process so that the dynamic range and the gain of the signal are controlled. Then, the image is output.

The apparatus disclosed in Jpn. Pat. Appln. KOKAI Publication No. 5-167889 has a structure such that an average value and a standard deviation of image data are used to calculate coefficients and add and multiply the coefficients so as to control the dynamic range and the gain. As a result of the foregoing method, an image having a wide latitude and excellent contrast can be displayed on the monitor.

Moreover, the following technique has been disclosed in Jpn. Pat. Appln. KOKAI Publication No. 57-39673: the shutter speed is controlled or an ND filter is used to change the quantity of exposure of the image pickup device, and then two obtained images having different quantities of exposure are synthesized so that the image pickup dynamic range is widened.

In Jpn. Pat. Appln. KOKAI Publication No. 7-75026, a technique has been disclosed in which the characteristic at a connection point of wide dynamic range signals obtained by synthesizing two or more images having different quantities of light are made to be adequate.

A technique is known which provides a knee characteristic as shown in FIG. 1 in order to compress a wide dynamic range signal.

However, the techniques disclosed in Jpn. Pat. Appln. KOKAI Publication No. 57-39673 and Jpn. Pat. Appln. KOKAI Publication No. 7-75026 have no contrivance to solve a problem in that the noise level at the connection point is rapidly changed. When two images having different quantities of exposure are synthesized, noise is simultaneously amplified because an image signal having a smaller quantity of exposure is multiplied with an exposure quantity ratio with the image signal having a larger quantity of exposure as shown in FIG. 2.

In an example case where images photographed with quantities of exposure respectively realized by shutter speeds of $1/60$ second and $1/2000$ second are synthesized, the signal obtained at the shutter speed of $1/2000$ second is amplified to 32 times. At this times, also the noise level is amplified to 32 times. Even if the dynamic range of the image to be picked up is not considerably wide, the noise level is amplified to 32 times. Therefore, the noise level is rapidly raised at the connection point and thus the quality of the image deteriorates excessively. The above-mentioned problems become more critical as the exposure quantity ratio is raised in order to widen the image pickup dynamic range.

The method for synthesizing two images having different quantities of exposure shown in FIG. 2 and arranged to provide the knee characteristic for the synthesized wide dynamic range signal is permitted to add two image signals having different quantities of exposure to realize the knee characteristic. It is preferably that two image signals having different quantities of exposure be switched because the S/N ratio deteriorates by about 3 dB. A case where the quantity of exposure is made such that the dynamic ranges are fixed to $1/60$ second and $1/2000$ second is considered. Since the dynamic range is fixed to $1/2000$ second even if the dynamic range of the object is not considerably wide and the adequate value of the high shutter speed is, for example, $1/200$ second, an image having a bright portion having an excessively low contrast is unintentionally formed.

The techniques disclosed in Jpn. Pat. Appln. KOKAI Publication No. 6-319149 and Jpn. Pat. Appln. KOKAI Publication No. 5-167889 have no contrivance to output a moving image in accordance with a calculation time period of the coefficients for controlling the dynamic range and the gain by calculating the average value and the standard deviation from image data. In a case where the brightness of the image is always changed as a moving image, a long time is required to perform the calculation of an image (for example, in a case where a light source, such as stroboscope is operated) having the brightness which is rapidly changed. Thus, there arises a problem in that an excessively long time is required to display an image having a wide latitude and excellent contrast.

BRIEF SUMMARY OF THE INVENTION

Accordingly, a first object of the present invention is to provide an image pickup apparatus having a structure for enlarging the image pickup dynamic range by synthesizing a plurality of images having different quantities of exposure and capable of preventing rise of the noise level at the connection point.

A second object of the present invention is to provide an image pickup apparatus having a structure for enlarging the image pickup dynamic range by synthesizing a plurality of two images having different quantities of exposure and capable of preventing reduction in the contrast of bright portions to correspond to the dynamic range of an object required to be photographed.

A third object of the present invention is to provide an image processing apparatus capable of always outputting an optimum image even if the brightness is changed considerably.

That is, according to one aspect of the present invention, there is provided an image pickup apparatus comprising: image pickup means; detection means for detecting the level of an output signal from the image pickup means; determining means for determining a first quantity of exposure of the image pickup means in accordance with an output denoting a result of detection performed by the detection means; and synthesizing means for synthesizing a first image signal picked up with the first quantity of exposure and at least one second image signal picked up with a second quantity of exposure which is larger than the first quantity of exposure.

According to another aspect of the present invention, there is provided an image processing apparatus structured to pick up moving images of at least two screens such that the quantity of exposure is changed, synthesize picked up image data of at least two screens having the different quantities of exposure, compress the dynamic range of the synthesized image data to correspond to the dynamic range of an output apparatus and output the image, the image processing apparatus comprising: compression coefficient calculating means for calculating a first compression coefficient for performing compression of the dynamic range of synthesized image data; calculated compression-coefficient storage means for storing the first compression coefficient obtained by the compression coefficient calculating means; compression coefficient storage means for previously storing a second compression coefficient to be adaptable to a case where change in the brightness of-an image exceeds a predetermined range when a moving image is picked up; compression coefficient output switch means for switching and outputting the first compression coefficient stored in the calculated compression-coefficient storage means in a case where the change in the brightness of the image when the moving image is picked up is included in the predetermined range and switching and outputting the second compression coefficient stored in the compression coefficient storage means in a case where the change in the brightness of the image when the moving image is picked up exceeds the predetermined range; and compressing means for compressing the dynamic range of image data obtained by synthesizing the images of at least two screens having different quantities of exposure in accordance with the compression coefficient output from the compression coefficient output switch means.

According to another aspect of the present invention, there is provided an image processing apparatus structured to pick up moving images of at least two screens such that the quantity of exposure is changed, synthesize picked up image data of at least two screens having the different quantities of exposure, compress the dynamic range of the synthesized image data to correspond to the dynamic range of an output apparatus and output the image, the image processing apparatus comprising: compression coefficient calculating means for calculating a first compression coefficient for performing compression of the dynamic range of synthesized image data; calculated compression-coefficient storage means for storing the compression coefficient obtained by the compression coefficient calculating means; compression coefficient setting means capable of setting and changing the compression coefficient stored in the calculated compression-coefficient storage means; compressing means for compressing the dynamic range of image data obtained by synthesizing the images of at least two screens having different quantities of exposure in accordance with the compression coefficient output from the calculated compression-coefficient storage means; and compression coefficient display means for displaying the compression coefficient output from the calculated compression-coefficient storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A through 4E are timing charts of operation timings of the image pickup apparatus according to the first embodiment from storage of signal charges to the operation which is performed by a synthesizing circuit, in which FIG. 4A is a timing chart of a vertical synchronizing signal (VD), FIG. 4B is a timing chart showing the temporal transition of the signal level of the stored charges in the image pickup device, FIG. 4C is a timing chart showing the timing for reading an image signal corresponding to a long-time exposure signal in an output from a synchronizing circuit, FIG. 4D is a timing chart showing the timing for reading an image signal corresponding to a short-time exposure signal in an output from the synchronizing circuit, and FIG. 4E is a timing chart showing the timing at which the image signals synchronized by the synchronizing circuit are synthesized;

FIGS. 8A through 8E are timing charts of operation timings of the image pickup apparatus according to the second embodiment from storage of signal charges to the operation which is performed by a synthesizing circuit, in which FIG. 8A is a timing chart of a vertical synchronizing signal (VD), FIG. 8B is a timing chart showing the temporal transition of the signal level of the stored charges in the image pickup device, FIG. 8C is a timing chart showing the timing for reading an image signal corresponding to a long-time exposure signal in an output from a synchronizing circuit, FIG. 8D is a timing chart showing the timing for reading an image signal corresponding to a short-time exposure signal in an output from the synchronizing circuit, and FIG. 8E is a timing chart showing the timing at which the image signals synchronized by the synchronizing circuit are synthesized;

FIGS. 9A through 9F show states of charge storage in the image pickup device of the image pickup apparatus according to the second embodiment under control of an image-pickup-device drive circuit, in which FIG. 9A is a diagram showing storage of signals in a usual storage operation and state of a transferring operation, FIG. 9B is a diagram showing a vertical transference state in the usual storage operation, FIG. 9C is a diagram showing a state where two pixels are added in the usual storage operation, FIG. 9D is a diagram showing storage of signals and state of a transferring operation in a storage operation in a vertical blanking period, FIG. 9E is a diagram showing a vertical transference state in a storage operation in the vertical blanking period, and FIG. 9F is a diagram showing a state in which two pixels are added in a storage operation in the vertical blanking period;

FIG. 13 is a graph showing the timing of non-destructive reading of the image pickup device of the image pickup apparatus according to the third embodiment;

FIG. 14 is a graph showing the characteristic of a synthesizing circuit of the image pickup apparatus according to the third embodiment;

FIG. 18 is a block diagram showing the structure of an image processing apparatus according to a fifth embodiment of the present invention.

DETAILED DESCRIPTION OF THE INVENTION

Figures 1, 2, 3:
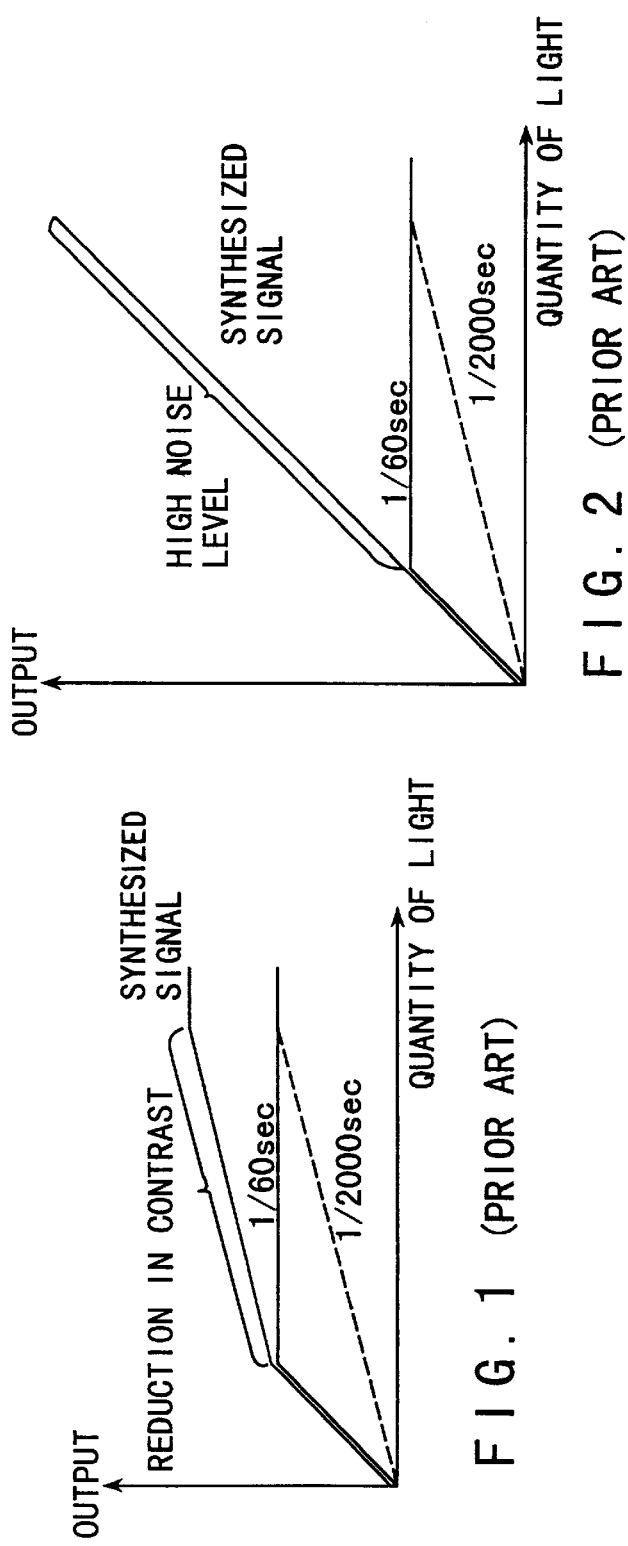
FIG. 1 is a graph showing an example of the relationship between the quantity of light and outputs realized by a conventional image pickup apparatus in a case where two images having different quantities of exposure are synthesized and the synthesized signal is provided with a knee characteristic.
FIG. 2 is a graph showing an example of the relationship between the quantity of light and outputs realized by a conventional image pickup apparatus in a case where two images having different quantities of exposure are synthesized.
FIG. 3 is a block diagram showing the structure of an image pickup apparatus according to a first embodiment of the present invention.

Referring to the drawings, embodiments of the present invention will now be described.

FIG. 3 is a block diagram showing the structure of an image pickup apparatus according to a first embodiment of the present invention.

As shown in FIG. 3, the image pickup apparatus according to the first embodiment is composed of an image pickup device 12 capable of non-destructively reading image; an image-pickup-device drive circuit (TG) 14; an analog circuit 16; an A/D converter 18; a synchronizing circuit 20; a synthesizing circuit 22; a maximum-value detection circuit 24; a gradation conversion circuit 26; and a D/A converter 28.

The image-pickup-device drive circuit 14 is a circuit for controlling the image pickup device 12 in response to a signal supplied from the maximum-value detection circuit 24. The analog circuit 16 is a processing circuit for processing an output signal from the image pickup device 12 before the signal is A/D converted. The A/D converter 18 converts an analog signal supplied from the analog circuit 16 into a digital signal.

The synchronizing circuit 20 makes coincide the timings of two image signals having different quantities of exposure in response to a signal supplied from the A/D converter 18. The synthesizing circuit 22 synthesizes the two image signals having different quantities of exposure from the synchronizing circuit 20. The maximum-value detection circuit 24 receives a signal output from the synchronizing circuit 20 to output control signals to the image-pickup-device drive circuit 14, the synchronizing circuit 20 and the synthesizing circuit 22 in accordance with a result of detection of the maximum value in the supplied signal.

The gradation conversion circuit 26 converts the gradation of the signal supplied from the synthesizing circuit 22. The D/A converter 28 converts a digital signal output from the gradation conversion circuit 26 into an analog signal so as to output the analog signal to an external apparatus.

The operation of this embodiment will now be described.

As shown in FIG. 3, the image pickup device 12 is driven by the image-pickup-device drive circuit 14 in such a manner that two images having different exposure time periods can be obtained. A signal output from the image pickup device 12 and corresponding to the formed image is adequately amplified by the analog circuit 16, and then converted into a digital signal by the A/D converter 18. The signal converted into the digital signal is, by the synchronizing circuit 20, divided into two image signals (a long-time exposure signal and a short-time exposure signal) having different quantities of exposure. Moreover, the timings of the two signals are made coincide with each other, and then output from the synchronizing circuit 20. Then, the synthesizing circuit 22 synthesizes a wide dynamic range signal. The gradation of the wide dynamic range signal is converted by the gradation conversion circuit 26, and then the wide dynamic range signal is converted into an analog signal by the D/A converter 28 so as to be output as a video signal.

Referring to timing charts shown in FIGS. 4A through 4E, the main operation of the image pickup apparatus according to this embodiment will now be described. FIGS. 4A through 4E are timing charts showing the operation timing of the image pickup apparatus according to this embodiment from storage of the charge of the signal to the process which is performed by the synthesizing circuit 22.

FIG. 4A shows a vertical synchronizing signal (VD). FIG. 4B shows temporal transition of the signal level of the stored charge of the image pickup device 12. Referring to FIG. 4B, Si (i=0, 1, 2, . . .) indicates timings at which image signals corresponding to the short-time exposure signal are read, while Li (i=0, 1, 2, . . .) indicates timings at which image signals corresponding to the long-time exposure signal are read. At timing Si, the image signal is non-destructively read, and the image signal is reset to the initial value immediately after the image signal has been read at timing Li so that storage of the signals is started. Then, a similar operation is repeated.

The synchronizing circuit 20 is supplied with the image signals Si and Li output from the image pickup device 12 so that the image signals Si and Li are synchronized with each other, as shown in FIGS. 4C and 4D. In a period including timings S2 and L2 for storing image signals shown in FIG. 4B, image signals stored previously and output at timings S1 and L1 are synchronized with each other. In the synthesizing circuit 22, the foregoing synchronized image signals are synthesized, as shown in FIG. 4E. Note that FIGS. 4C through 4E show image signals read at timings Si and Li and indicated with the same sign for convenience.

Figure 6:
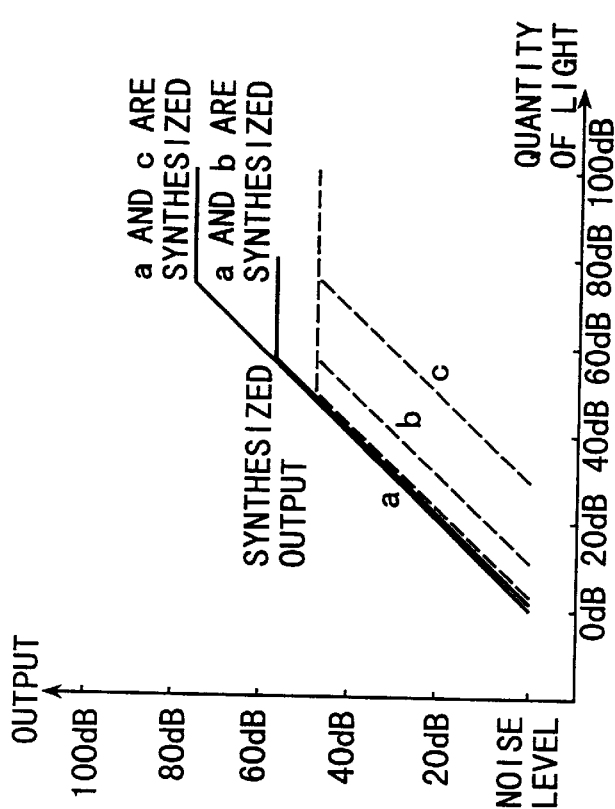
FIG. 6 is a graph showing the characteristic of the synthesizing circuit of the image pickup apparatus according to the first embodiment.
Figure 5:
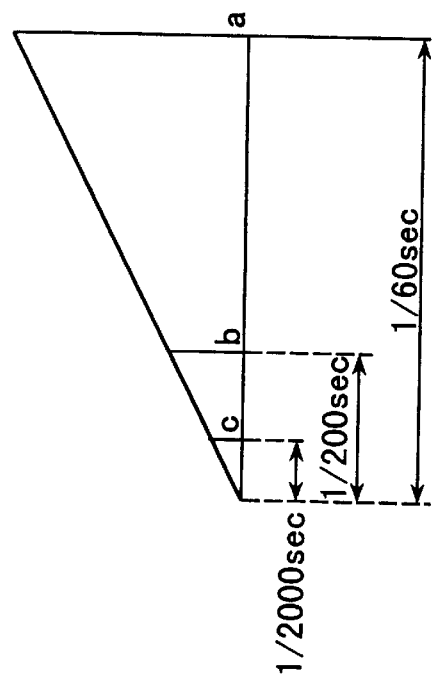
FIG. 5 is a graph showing the timing of non-destructive reading which is performed by the image pickup device of the image pickup apparatus according to the first embodiment.

FIG. 5 is a graph showing the timing at which the non-destructive reading operation is performed in the structure according to this embodiment. FIG. 6 is a graph showing the characteristic of the synthesizing circuit 22 according to this embodiment. The characteristics are, in FIGS. 5 and 6 indicated with symbols a, b and c when the signal storage times are 1/60 second, 1/200 second and 1/2000 second and each characteristic has a dynamic range of 50 dB.

As shown in FIG. 6, the synthesizing circuit 22 synthesizes signals respectively corresponding to the signal storage times 1/60 second and 1/200 second, that is, a and b or signals respectively corresponding to the signal storage times 1/60 second and 1/2000 second, that is, a and c. When signal a corresponding to signal storage time 1/60 second and signal c corresponding to signal storage time 1/2000 second are synthesized, the signal c is amplified to the ratio of 1/60 second and 1/2000 second, that is, about 32 times when signal a has been saturated. Thus, a dynamic range of 80 dB can be obtained. However, also the noise level is rapidly raised 32 times at the connection point and thus there is a fear of deterioration of the quality of the image.

When signal a corresponding to signal storage time 1/60 second and signal b corresponding to signal storage time 1/200 second are synchronized with each other, the dynamic range is widened to only 60 dB. However, the noise level at the connection point is raised to only about three times. Therefore, any critical problem arises for the quality of the image.

In view of the foregoing, this embodiment has a structure such that the maximum-value detection circuit 24 detects the maximum value of the signal having the shorter signal storage time. A control signal is output from the maximum-value detection circuit 24 to the image-pickup-device drive circuit 14, the control signal being arranged to shorten the signal storage time if the maximum value reaches the saturation and elongate the signal storage time if the maximum value does not reach the saturation level.

A specific control method will now be described. For example, the maximum-value detection circuit 24 outputs "1" if the maximum value reaches the saturation level and outputs "0" if the same does not reach the saturation level. If "1" has been output, the image-pickup-device drive circuit 14 shortens the exposure time by a predetermined length in order to reduce the quantity of exposure by a predetermined quantity. If "0" has been output, the exposure time is elongated by a predetermined length in order to enlarge the quantity of exposure by a predetermined quantity. That is, change in the quantity of exposure determined in accordance with the output from the maximum-value detection circuit 24 is used to determine the time required for the quantity of exposure to be converged to an optimum value.

The quantity of exposure may be controlled in a real time manner by, in one field period, sequentially reading the output signal from the image pickup device 12 which is capable of non-destructively reading image. The quantity of exposure of a usual image pickup device, such as a CCD, may be controlled by reading signals in plural fields.

In response to the control signal, the image-pickup-device drive circuit 14 controls the signal storage time in such a manner that the signal having the shorter signal storage time is correctly made to be the saturation level. Since the timing of output of the signal is changed in accordance with the synchronizing circuit 20 and the signal storage time and therefore the ratio of the signal storage times, that is, the gain with respect to the signal having the shorter signal storage time is changed, the maximum-value detection circuit 24 outputs the control signal as well as to the synthesizing circuit 22.

The image-pickup-device drive circuit 14 controls the signal storage time to be elongated as long as possible in a range in which the maximum value of the signal having the shorter signal storage time is not saturated. Therefore, the ratio of the quantity of exposure with which the image signal having the shorter signal storage time is multiplied can be minimized when two images are synthesized. Thus, the noise component can be minimized.

A second embodiment of the present invention will now be described.

Figure 7:
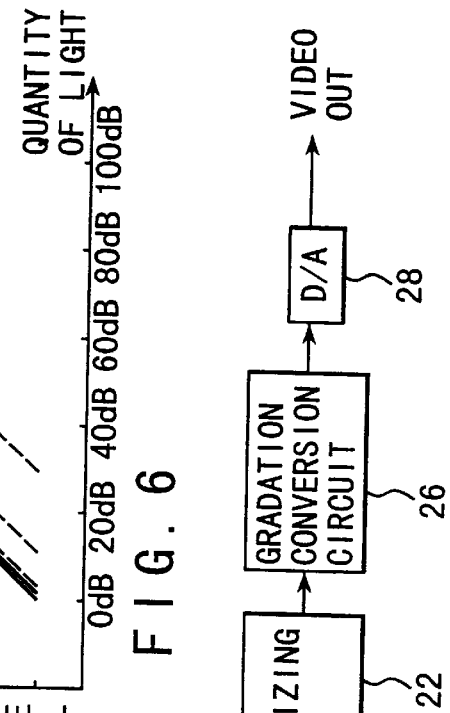
FIG. 7 is a block diagram showing the structure of an image pickup apparatus according to a second embodiment of the present invention.

FIG. 7 is a block diagram showing the structure of an image pickup apparatus according to a second embodiment of the present invention.

As shown in FIG. 7, the image pickup apparatus according to the second embodiment has an image pickup device 32, such as a CCD; an image-pickup-device drive circuit (TG) 14; an analog circuit 16; an A/D converter 18; a synchronizing circuit 20; a synthesizing circuit 22; a maximum-value detection circuit 24; a gradation conversion circuit 26; and a D/A converter 28. The maximum-value detection circuit 24 receives a signal output from the synchronizing circuit 20 and outputs a control signal to the image-pickup-device drive circuit 14 and the synthesizing circuit 22 in accordance with a result of detection of a maximum value in the supplied signal.

That is, the image pickup apparatus according to the second embodiment is different from the image pickup apparatus shown in FIG. 3 and according to the first embodiment in the structure of the image pickup device 32 and the blocks which are controlled in response to the control signals output from the maximum-value detection circuit 24.

The main operation of the image pickup apparatus according to the second embodiment will now be described with reference to timing charts shown in FIGS. 8A through 8E and a diagram shown in FIG. 9.

FIGS. 8A through 8E are timing charts of the image pickup apparatus according to the second embodiment showing the operations to be performed from storage of signals charges and the operation to be performed by the synthesizing circuit 22. FIG. 9 is a view of explanatory showing a state of electric charges in the image pickup device 32 of the image pickup apparatus according to this embodiment under control of the image-pickup-device drive circuit 14.

Initially, referring to timing charts shown in FIGS. 8A through 8E, the operations to be performed from storage of signal charges to the operation to be performed by the synthesizing circuit 22 will now be described.

Referring to FIGS. 8A through 8E, generations of the vertical synchronizing signal (see FIG. 8A), the long-time exposure signal (see FIG. 8C), the short-time exposure signal (see FIG. 8D) and the synthesized image (see FIG. 8E) are basically the same as those according to the first embodiment (see timing charts shown in FIGS. 4A through 4E). Therefore, the same operations are omitted from description.

Figure 8:
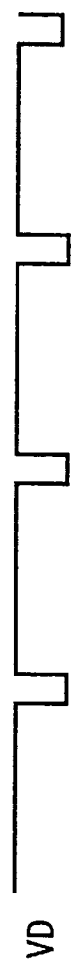

In the second embodiment, the method of generating the signal storage time is different from the first embodiment, as shown in FIG. 8B. That is, the second embodiment has a structure such that the signal Li (i=0, 1, 2, ...) corresponding to the long time exposure is exposed in a usual field period and the signal Si (i=0, 1, 2, ...) corresponding to the short time exposure is exposed in the vertical blanking period, as shown in FIG. 8B.

Referring to FIGS. 9A through 9F, storage of charges of the long-time exposure signal and the short-time exposure signal, which have been exposed to light as described above, in the image pickup device 32 and transference of the same will now be described.

FIGS. 9A and 9C show storage and transference of the signals in a usual field period. Referring to FIG. 9A, signals stored at pixels PD1 and PD3 are transferred to a vertical transference passage (hereinafter abbreviated as "VCCD"). The signals transferred to the VCCD are shifted by a degree corresponding to one pixel in the vertical direction, as shown in FIG. 9B. Signals stored in pixels PD2 and PD4 are transferred to the VCCD similarly to the signals shown in FIG. 9A so that the signal stored in the pixel PD1 and the signal stored in the pixel PD2 are added to each other and the signal stored in the pixel PD3 and the signal stored in the pixel PD4 are added to each other, as shown in FIG. 9C.

Signals stored in the pixel PD1 and PD3 in the vertical blanking period are transferred to the VCCD, as shown in FIG. 9D. Similarly to FIG. 9B, the signals transferred to the VCCD are, as shown in FIG. 9E, transferred in the vertical direction in a quantity corresponding to one pixel. Similarly to FIG. 9C, the signal stored in the pixel PD1 and that stored in the pixel PD2 are added to each other, the signal stored in the pixel PD3 and that stored in the pixel PD4 are added to each other, as shown in FIG. 9F.

As a result of the foregoing operation, the long-time exposure signals obtained by adding signals at two pixels and stored in the usual field period and the short-time exposure signals stored in the vertical blanking period are alternately transferred to the VCCD, and then transferred to the horizontal transference passage (HCCD) by a known method (not shown) so that signals are read.

Signals output from the image pickup device 32 and corresponding to the formed images are adequately amplified by the analog circuit 16, and then converted into digital signals by an A/D converter 18. The signals converted into the digital signals are separated into two image signals having different quantities of exposure by the synchronizing circuit 20. Moreover, the timings of the two image signals are made coincide with each other. Thus, a wide dynamic range signal is synthesized by the synthesizing circuit 22. The gradation of the wide dynamic range signal is converted adequately by the gradation conversion circuit 26 so as to be output as a video signal through the D/A converter 28.

Figure 10:
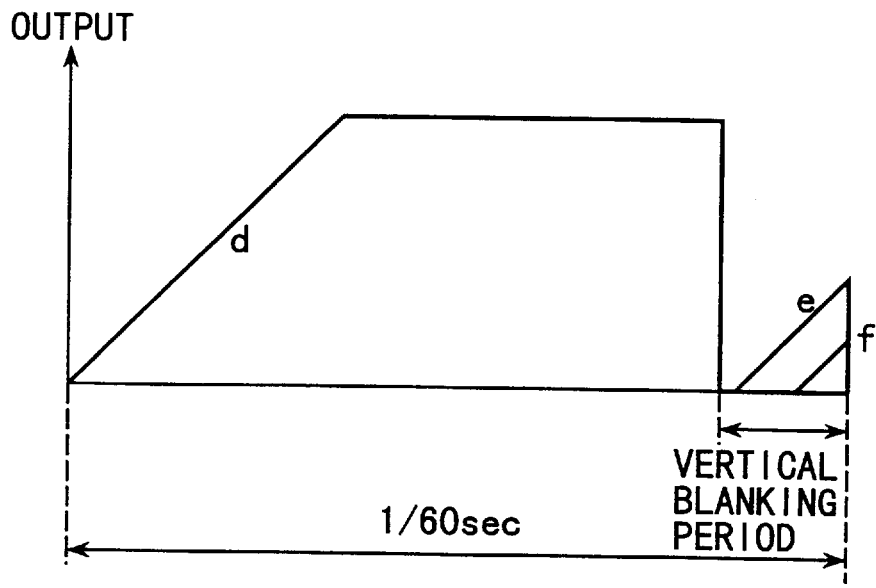
FIG. 10 is a graph showing the reading timing of the image pickup device of the image pickup apparatus according to the second embodiment.
Figure 11:
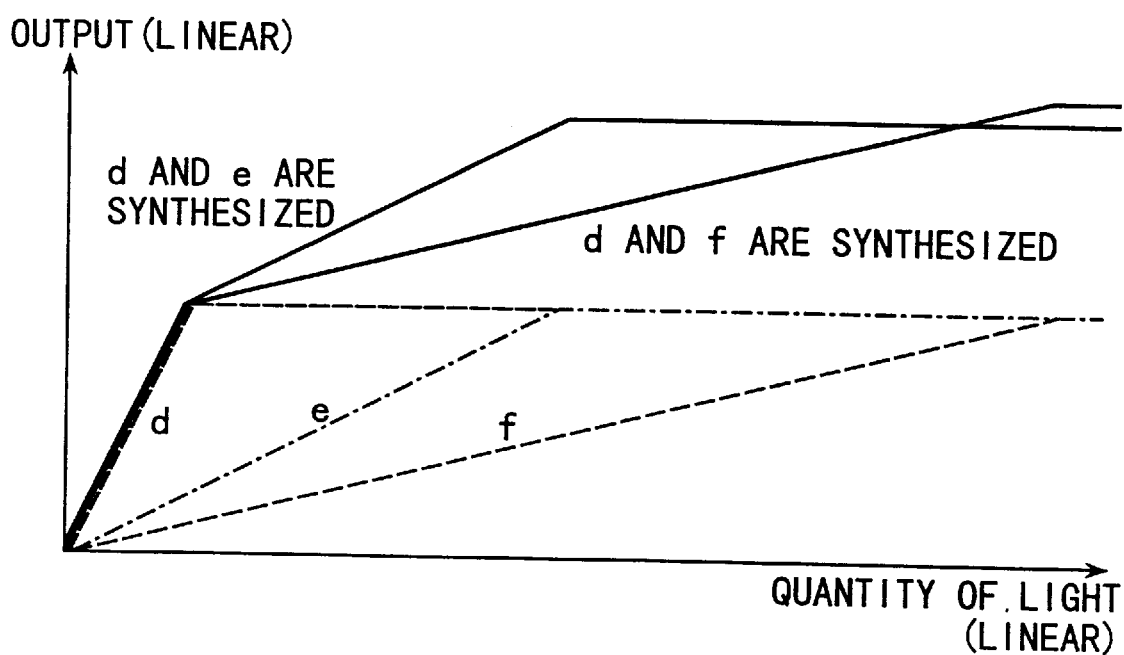
FIG. 11 is a graph showing the characteristic of the synthesizing circuit of the image pickup apparatus according to the second embodiment.

FIG. 10 is a graph showing timing for the image pickup device 32 to read an image according to the second embodiment. FIG. 11 is a graph showing the characteristic of the synthesizing circuit 22 according to the second embodiment. Referring to FIGS. 9 and 10, symbols $d$, $e$ and $f$ indicate characteristics respectively realized when signal storage times are $1/65$ second, $1/1000$ second and $1/2000$ second.

The second embodiment has a structure such that the inclination of the characteristic of the synthesized signal obtained by two images having different quantities of exposure between the quantity of light and output is changed as shown in FIG. 11, that is, a so-called knee characteristic is provided. Although two image signals having different quantities of exposure may simply be added to each other to realize the knee characteristic, it is preferable that the two images having different quantities of exposure be switched to prevent deterioration in the S/N ratio of a low brightness portion. In consideration of the foregoing fact, the second embodiment has a structure such that the level of the signal having the shorter signal storage time is shifted when the signal having the longer signal storage time has been saturated in order to prevent deterioration in the S/N ratio of the low brightness portion.

The maximum-value detection circuit 24 outputs, to the image-pickup-device drive circuit 14, a control signal for shortening the signal storage time if the maximum value of the signal having the shorter signal storage time and as well as the maximum value has reached the saturation level and for elongating the signal storage time if the maximum value has not reached the saturation level. The image-pickup-device drive circuit 14 follows the control signal to control the signal storage time in such a manner that the signal having the shorter signal storage time is correctly made to be the saturation level. Since the quantity of the level shift when the synthesis is performed becomes different depending upon the signal storage time, the maximum-value detection circuit 24 supplies the control signal also to the synthesizing circuit 22.

As described above, the image-pickup-device drive circuit 14 is controlled in such a manner that the signal storage time is elongated as long as possible in a range in which the maximum value of the signal having the shorter signal storage time is not saturated. Therefore, lowering of the contrast of the bright portion occurring when the two images are synthesized can be prevented satisfactorily.

The various elements of the second embodiment may be modified and changed variously. For example, the image pickup device 32 according to this embodiment comprising the CCD may be an image pickup apparatus capable of non-destructively reading an image and having the structure according to the first embodiment may be employed. Since the second embodiment has the structure such that the signal having the shorter signal storage time is obtained in the vertical blanking period, the longest signal storage time is about $1/800$ second. If the image pickup apparatus capable of non-destructively reading an image is employed, the shorter signal storage time can be set to be $1/60$ second or shorter. Therefore, a further satisfactory effect can be obtained.

If the two images having different quantities of exposure are synthesized while providing the knee characteristic, reduction in the contrast of the bright portion can be minimized.

A third embodiment of the present invention will now be described.

Figure 12:
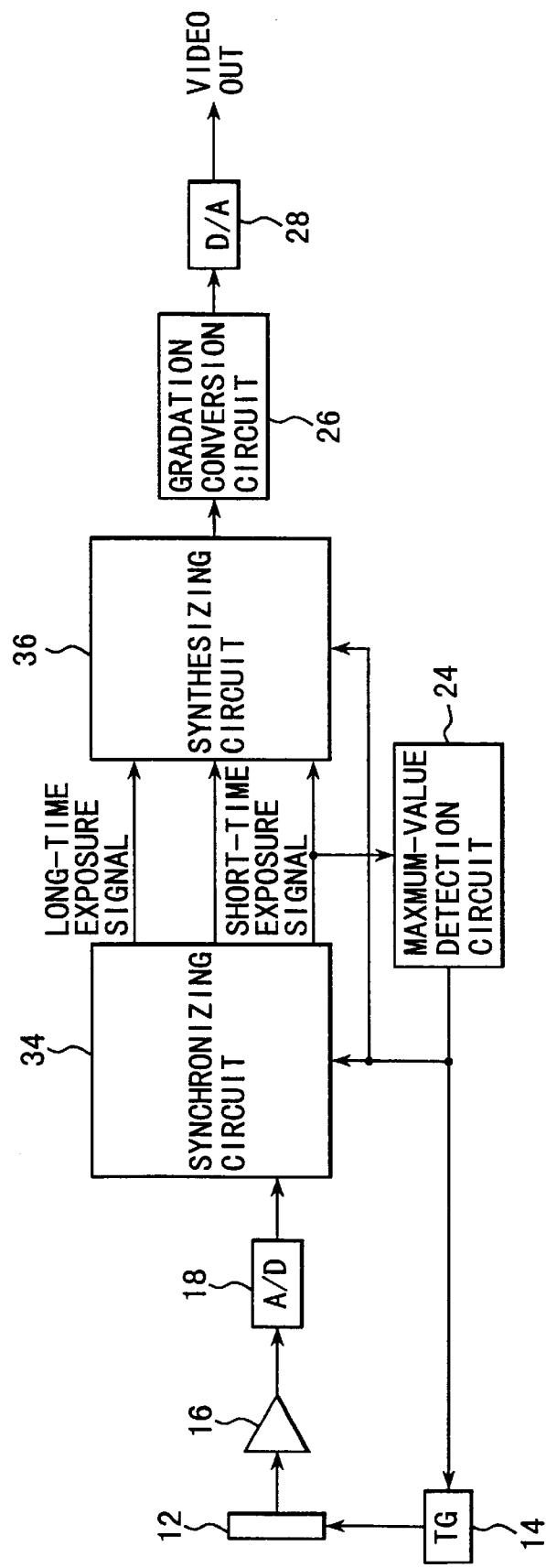
FIG. 12 is a block diagram showing the structure of the image pickup apparatus according to a third embodiment of the present invention.

FIG. 12 is a block diagram showing the structure of an image processing apparatus according to the third embodiment of the present invention.

The image pickup apparatus according to the third embodiment has a basic structure which is similar to that of the first embodiment. In comparison to the first embodiment having the structure such that two images having different quantities of exposure are synthesized, the third embodiment has a structure such that three or more images (which is four in this embodiment) are synthesized.

Accordingly, a synchronizing circuit 34 makes coincide the timings of four image signals having different quantities of exposure. A synthesizing circuit 36 according to this embodiment synthesizes the four image signals having the different quantities of exposure. The other structures are the same as those of the first embodiment shown in FIG. 3 and also the operation timing is the same as that set in the first embodiment. Therefore, the same elements and operations are omitted from detailed description.

The main operation of the image pickup apparatus according to the third embodiment will now be described with reference to FIGS. 13 and 14.

FIG. 13 is a graph showing non-destructive reading timing according to the third embodiment. FIG. 14 is a graph showing the characteristic of the synthesizing circuit 36 according to the third embodiment. The characteristics are, in FIGS. 13 and 14, shown such that the characteristics when the signal storage times are 1/60 second, 1/250 second, 1/1000 second and 1/4000 second are indicated by symbols g, h, i and j, respectively, each characteristic having a dynamic range of 50 dB.

The signal storage times h, i and j are shifted from the signal storage time g by 12 dB, 24 dB and 36 dB with respect to the quantity of light. The synthesizing circuit 36 uses g when the quantity of light is 0 dB to 50 dB and h when the quantity of light is 50 dB to 62 dB such that g and h are amplified to the ratio of 1/60 second and 1/250 second, that is, to about four times. When the quantity of light is 62 dB to 74 dB, the synthesizing circuit 36 uses i such that i is amplified to the ratio of 1/60 second and 1/1000 second, that is, to about 16 times. When the quantity of light is 74 dB to 86 dB, the synthesizing circuit 36 uses j such that j is amplified to the ratio of 1/60 second and 1/4000 second, that is, to about 64 times. Thus, a signal having a wide dynamic range of 86 dB can be obtained. Since four images are synthesized, the significantly large dynamic range, which cannot be realized by synthesis of two images, can be realized.

If the dynamic range of an object attempted to be photographed is not considerably wide, the maximum-value detection circuit 24 outputs, to the image-pickup-device drive circuit 14, a control signal for controlling the non-destructive reading timing such that the signal storage time is shortened in a case where the maximum value of the signal having the shortest signal storage time has been detected and the maximum value has reached the saturation level and the signal storage time is elongated in a case where the maximum value has not reached the saturation level. In response to the control signal, the signal storage time is controlled in such a manner that the signal having the shortest signal storage time is correctly made to be the saturation level by the image-pickup-device drive circuit 14. The non-destructive reading to be performed from the signal having the shortest signal storage time of 1/60 second is determined such that the intervals are logarithmically the same.

Figure 15:
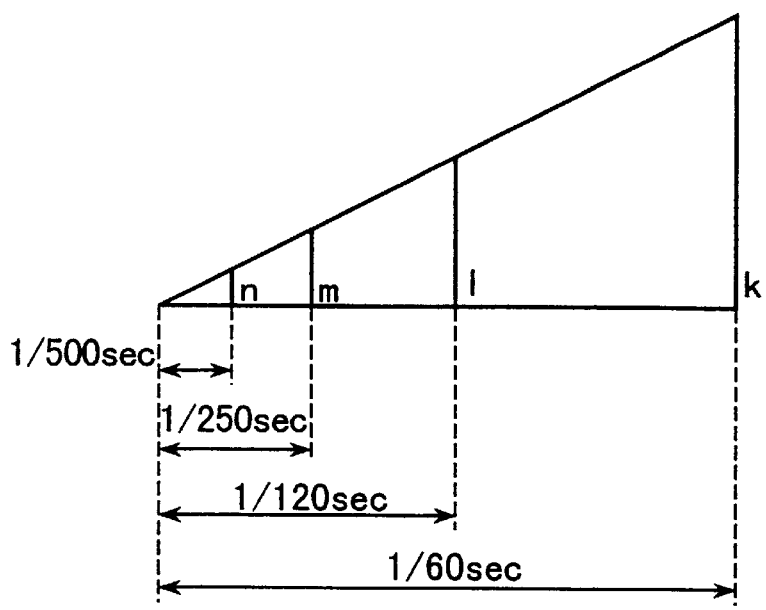
FIG. 15 is a graph showing another example of the non-destructive reading timing of the image pickup device of the image pickup apparatus according to the third embodiment.
Figure 16:
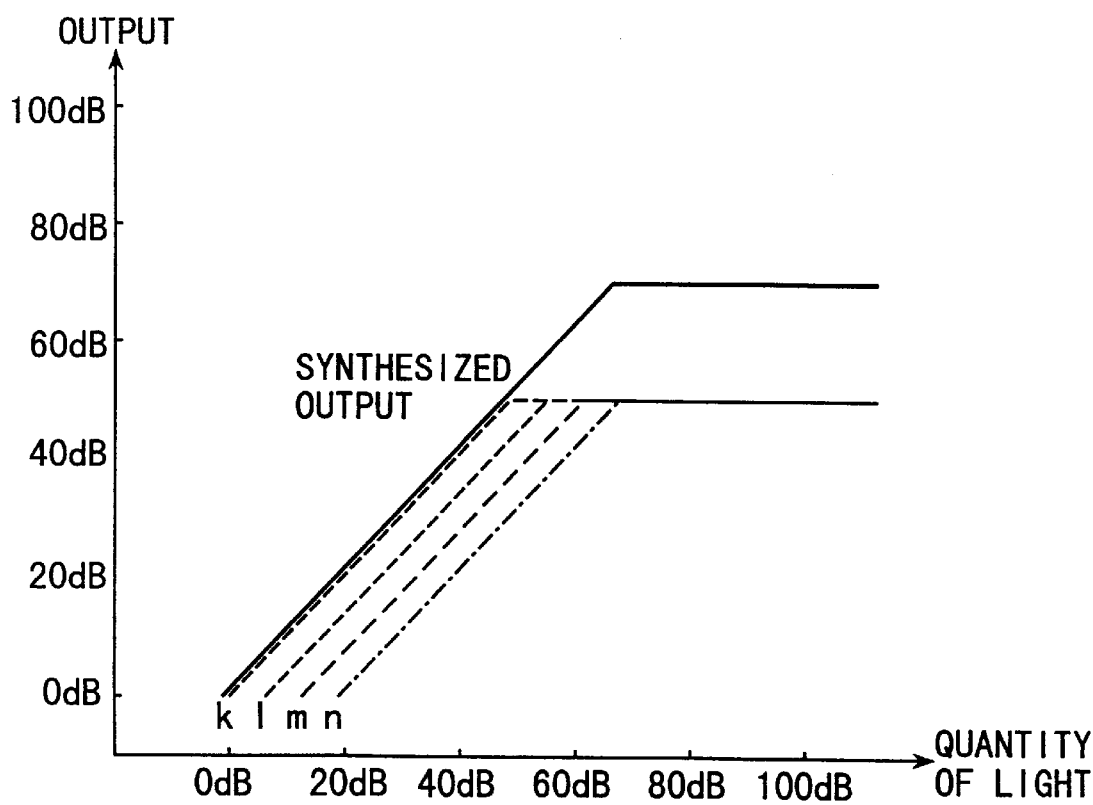
FIG. 16 is a graph showing another example of the characteristic of the synthesizing circuit of the image pickup apparatus according to the third embodiment shown in FIG. 15.

If the dynamic range of an object is, for example, about 70 dB, signals are non-destructively read at timings shown in FIG. 15. The characteristics of the synthesizing circuit 36 are as shown in FIG. 16. Referring to FIG. 16, symbols k, l, m and n indicate signal storage times 1/60 second, 1/120 second, 1/250 second and 1/500 second and have a dynamic range of 50 dB. The symbols l, m and n indicate characteristics shifted from the characteristic indicated by k by 64 dB, 12 dB and 18 dB with respect to the quantity of light.

The synthesizing circuit 36 uses k when the quantity of light is 0 dB to 50 dB and l when the quantity of light is 50 dB to 56 dB such that k and l are amplified to the ratio of 1/60 second and 1/120 second, that is, to about two times. When the quantity of light is 56 dB to 62 dB, m is amplified to the ratio of 1/60 second and 1/250 second, that is, to about four times. When the quantity of light is 62 dB to 68 dB, n is amplified to the ratio of 1/60 second to 1/500 second, that is, to about 8 times. Thus, a signal having a dynamic range of 68 dB can be obtained.

As described above, the third embodiment has a structure such that the image-pickup-device drive circuit 14 is controlled in such a manner that the signal storage time is elongated as long as possible in a range in which the maximum value of a signal having the shorter signal storage time is not saturated. Therefore, the ratio of the quantity of exposure with which the non-destructive reading signal having the short signal storage time is multiplied can be minimized when an image is synthesized. As a result, the noise component can be minimized.

The third embodiment has the structure such that the synthesizing circuit 36 synthesizes the signals in such a manner that the output is formed into a linear shape with respect to the quantity of light. The synthesis may be performed with the characteristic having plural levels of the knee characteristic. In this case, an effect can be obtained in that reduction in the contrast in a bright portion can be minimized.

As described above, the third embodiment is characterized in that the structure has the image pickup means, the control means for reading a plurality of images having different quantities of exposure from the image pickup means and the synthesizing means for synthesizing the plurality of the obtained images, wherein the control means varies the signal storage time of the image pickup means in response to the image pickup signal. That is, since the control means performs the control to correspond to the image pickup means in such a manner that the quantity of exposure is enlarged maximally in a range in which the image pickup means is not saturated, an image having a minimum noise component and having an excellent S/N ratio can be obtained.

A fourth embodiment of the present invention will now be described.

Figure 17:
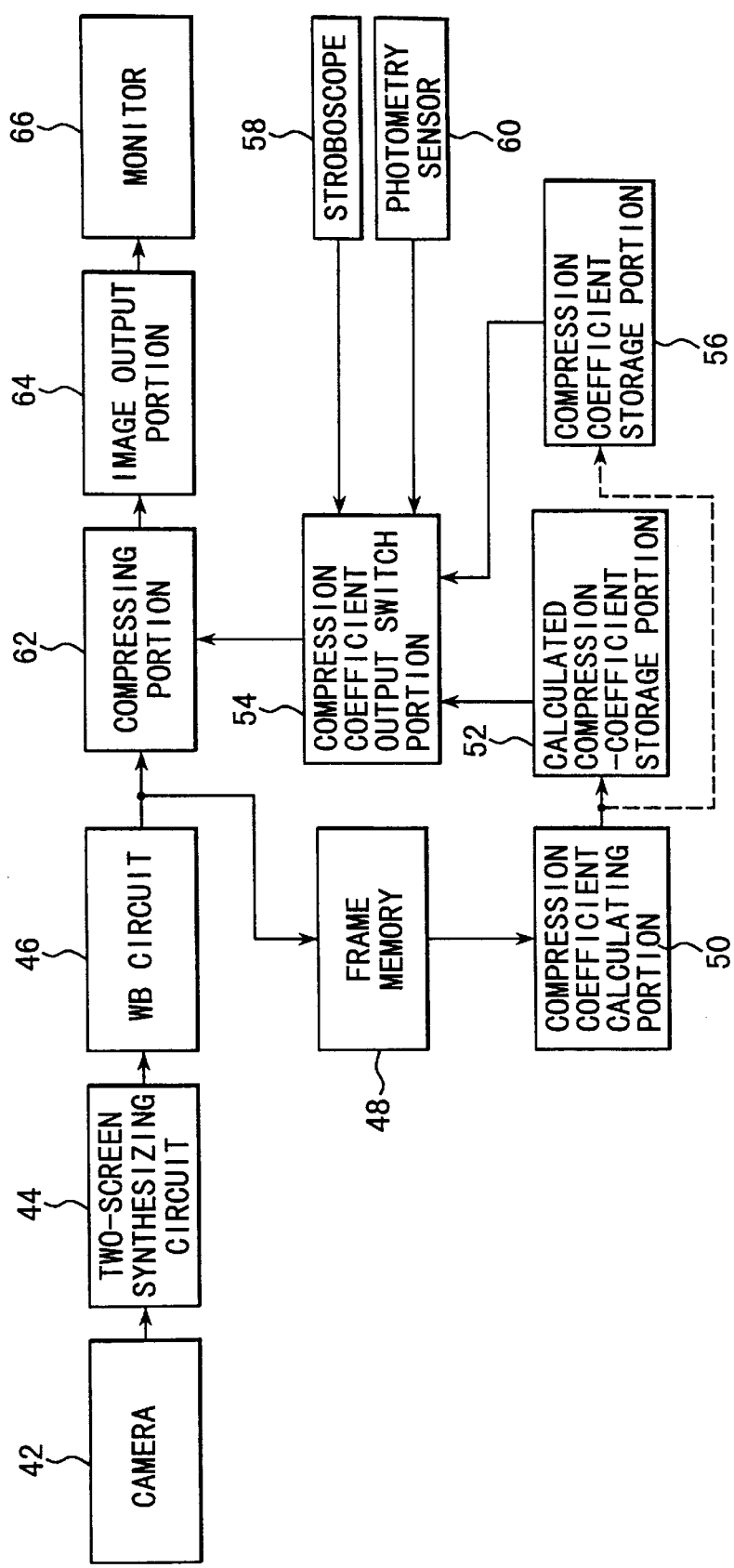
FIG. 17 is a block diagram showing the structure of an image processing apparatus according to a fourth embodiment of the present invention.

FIG. 17 is a block diagram showing the structure of an image processing apparatus according to a fourth embodiment of the present invention.

Referring to FIG. 17, an output from a camera 42 is supplied to a frame memory 48 and a compressing portion 62 through a two-screen synthesizing circuit 44 and a white balance (WB) circuit 46. An output from the frame memory 48 is subjected to a predetermined calculations in a compression coefficient calculating portion 50 so as to be stored in a calculated compression-coefficient storage portion 52 as a compression coefficient. The compression coefficient stored in the calculated compression-coefficient storage portion 52 and a compression coefficient calculated on an assumption of a rapid brightness change and stored in a compression coefficient storage portion 56 are supplied to a compression coefficient output switch portion 54.

A stroboscope 58 for emitting light which can be controlled in the apparatus and a photometric sensor 60 for determining change in the brightness of the image which is being photographed are connected to the compression coefficient output switch portion 54. An output from the compression coefficient output switch portion 54 is, together with an output from the white balance circuit 46, supplied to a compressing portion 62. An output image processed in the compressing portion 62 is supplied to a monitor 66 through an image output portion 64 so as to be displayed.

In the foregoing structure, the camera 42 takes a moving image. At this time, the camera 42 takes a short-time exposure image and a long-time exposure image when it takes an image of the moving image for one frame. Data items of two images having different quantities of exposure and taken by the camera 42 are transferred to the two-screen synthesizing circuit 44.

The two-screen synthesizing circuit 44 synthesizes image data of the two types of the screens transferred from the camera 42 and having different quantities of exposure so as to generate one image data and transfer the same to the white balance circuit 46. The white balance circuit 46 adjusts the color of image data synthesized by the two-screen synthesizing circuit 44.

Image data processed by the white balance circuit 46 is stored in the frame memory 48 and as well as transferred to the compressing portion 62. Image data stored in the frame memory 48 is transferred to the compression coefficient calculating portion 50. The compression coefficient calculating portion 50 sequentially reads image data obtained by synthesizing images of two screens stored in the frame memory 48 and having different quantities of exposure to calculate, for example, an average value, dispersion and a standard deviation, so as to obtain compression coefficients required in the compressing process.

The compression coefficients are a dynamic range coefficient for adjusting the data of synthesized image data to be adaptable to the dynamic range of the output apparatus; and a gain coefficient for adjusting a gain for amplifying image data adjusted to a low level with the dynamic range coefficient. The dynamic range coefficient and the gain coefficient can be expressed by the following equations:

$$Y'=bY^a \quad (1)$$

where Y is pre-compression image data, Y' is post-compression image data, $\underline{a}$ is a dynamic range coefficient and $\underline{b}$ is a gain coefficient.

As an alternative to this, the following equation may be employed:

$$Y'=\log bY^a \quad (2)$$

where Y is pre-compression image data, Y' is post-compression image data, $\underline{a}$ is a dynamic range coefficient and $\underline{b}$ is a gain coefficient.

The compression coefficient calculated by the compression coefficient calculating portion 50 is stored in the calculated compression-coefficient storage portion 52. The compression coefficient output switch portion 54 performs a switching process for outputting to the compressing portion 62 either the compression coefficient stored in the calculated compression-coefficient storage portion 52 or the compression coefficient stored in the compression coefficient storage portion 56 and previously calculated under assumption of rapid brightness change. Note that the compression coefficient storage portion 56 may comprise a memory in the image processing apparatus or may comprise an internal storage medium.

When a moving image is photographed in a state where the brightness is not changed considerably, the compression coefficient output switch portion 54 outputs the compression coefficient stored in the calculated compression-coefficient storage portion 52. At this time, the compression coefficient to be output to the compressing portion 62 is a compression coefficient calculated from image data taken several frame before because a long time is required to calculate the compression coefficient. Therefore, the output image is not the image which has been compressed with the proper compression coefficient. However, since the change in the brightness of the image which is being taken does not occur considerably, the change in the compression coefficient is not changed considerably. As a result, the output image is not affected excessively.

When a moving image, the brightness of which is considerably changed, is photographed (for example, when the camera is rapidly moved to a bright portion to take an image during an operation of photographing an image in a dark place), the compression coefficient output switch portion 54 outputs the compression coefficient stored in the compression coefficient storage portion 56 to the compressing portion 62. If the brightness of the image, which is being photographed, is rapidly changed, use of the compression coefficient of several frames before in the compressing process cannot realize an optimum image display. A long time is required to complete the calculations of the compression coefficient so as to display an optimum images. Therefore, the compression coefficient output switch portion 54 performs a switching operation to cause the compression coefficient previously stored in the compression coefficient storage portion 56 to be temporarily output until the compression coefficient calculating portion 50 completes the calculations of the compression coefficient and thus the compression process can be performed with an optimum compression coefficient. The foregoing case takes place when, for example, a dark place is rapidly lighted or its converse state.

To determine change in the brightness of an image which is being photographed, for example, information obtained from the photometric sensor 60 can be used. In this case, the compressing portion 62 compresses the dynamic range of image data transferred from the white balance circuit 46 in accordance with the compression coefficient output from the compression coefficient output switch portion 54. Image data compressed by the compressing portion 62 is transferred to the image output portion 64 to be processed so as to be displayed on the monitor 66. Then, the image is displayed on the monitor 66.

As described above, the fourth embodiment having the structure such that a compression coefficient corresponding to rapid change in the brightness is immediately used in the compressing process if the brightness is rapidly changed when an image is being photographed enables an optimum image to always be output.

As described above, the output from the calculated compression-coefficient storage portion 52 calculated by the compression coefficient calculating portion 50 and the output from the compression coefficient storage portion 56 can be switched by the compression coefficient output switch portion 54. Thus, an optimum compression coefficient corresponding to change in the brightness can be obtained. Therefore, an optimum image output can immediately be performed.

The compression coefficient output switch portion 54 includes means, such as the stroboscope 58, for emitting light which can be controlled in the apparatus. After the stroboscope 58 has emitted light, the compression coefficient output switch portion 54 outputs, to the compressing portion 62, the compression coefficient previously stored in the compression coefficient storage portion 56 and set when the stroboscope 58 emits light in accordance with an internal trigger output from the stroboscope 58 so that the compression process is performed.

When a still image is photographed by using the stroboscope 58 during an operation for photographing a moving image by using the stroboscope 58, the structure in which the compression coefficient set when the stroboscope 58 is used has been stored in the compression coefficient storage portion 56 enables an output of the compressed still image to be performed immediately. Therefore, change in the brightness can easily be determined and, therefore, the overall image output process can be simplified. Even if a still image is photographed by causing the stroboscope to emit light during the operation for photographing a moving image, a still image compressed to correspond to the light emission operation of the stroboscope can reliably be output.

Since a multiplicity of compression coefficients are provided so as to be switched in the compressing process, an image suitable to the scene and purpose of the photography can be output.

In general, an optimum image is displayed while being delayed for the time required to calculate the compression coefficient if a rapid change in the brightness of the image, which is being photographed, occurs. However, the fourth embodiment having the structure such that the compression coefficients corresponding to the changes in the brightness have been stored enables an operation to immediately be performed to correspond to the change in the brightness so as to display an image.

The elements according to the fourth embodiment may, of course, be changed and modified variously.

For example, a structure as indicated by a dashed line shown in FIG. 17 may be employed in which the compression coefficient calculating portion 50 and the compression coefficient storage portion 56 are connected to each other. If the brightness has been rapidly changed, the foregoing structure is arranged such that the compression coefficient calculated by the compression coefficient calculating portion 50 is stored in the compression coefficient storage portion 56. If the same change in the brightness occurs as has been experienced before, the compression coefficient output switch portion 54 outputs, to the compressing portion 62, the compression coefficient stored in the compression coefficient storage portion 56. Then, the compressing portion 62 performs the compressing process.

Since the compressing process is performed by using the compression coefficient calculated on the spot, an image compressed optimally can be output.

The compression coefficient storage portion 56 may be formed by an external detachable memory or an external storage medium in place of the internal memory or the internal storage medium.

A fifth embodiment of the present invention will now be described.

FIG. 18 is a block diagram showing the structure of an image processing apparatus according to a fifth embodiment of the present invention. The same elements as those of the fourth embodiment shown in FIG. 17 are given the same reference numerals and the same elements are omitted from description.

Referring to FIG. 18, image data processed by the white balance circuit 46 is transferred to the compressing portion 62 and the image thinning portion 68. The image thinning portion 68 subjects image data transferred from the white balance circuit 46 to a thinning process. The thinning process includes, for example, a simple thinning process in which the number of pixels of image data is reduced as ½, ¼, . . . , in both the longitudinal and horizontal directions.

Image data thinned by the image thinning portion 68 is stored in the frame memory 48. Image data stored in the frame memory 48 is transferred to the compression coefficient calculating portion 50. The compression coefficient calculating portion 50 synthesizes images of two screens stored in the frame memory 48 and having different quantities of exposure and calculates the compression coefficient required to perform the compressing process to be adaptable to the dynamic range of an output apparatus for sequentially reading image data having the thinned pixels.

The compression coefficient stored in the calculated compression-coefficient storage portion 52 is output to the compressing portion 62. The operations of the compressing portion 62, the image output portion 64 and the monitor 66 are the same as those according to the fourth embodiment.

Since the fifth embodiment has the foregoing structure such that the number of pixels of image data with which the compression coefficient is calculated has been reduced by the image thinning portion 68, the time required to calculate the compression coefficient can significantly be shortened. Moreover, the compressed image can quickly be output by a simple structure.

The elements of the fifth embodiment may, of course, be changed and modified variously.

For example, the thinning process, which is performed by the image thinning portion 68, may be performed such that only the horizontal pixels or vertical pixels are thinned or pixels in a specific portion are retained and the other pixels are removed to be adaptable to image data attempted to be photographed.

A sixth embodiment of the present invention will now be described with reference to FIG. 19.

Figure 19:
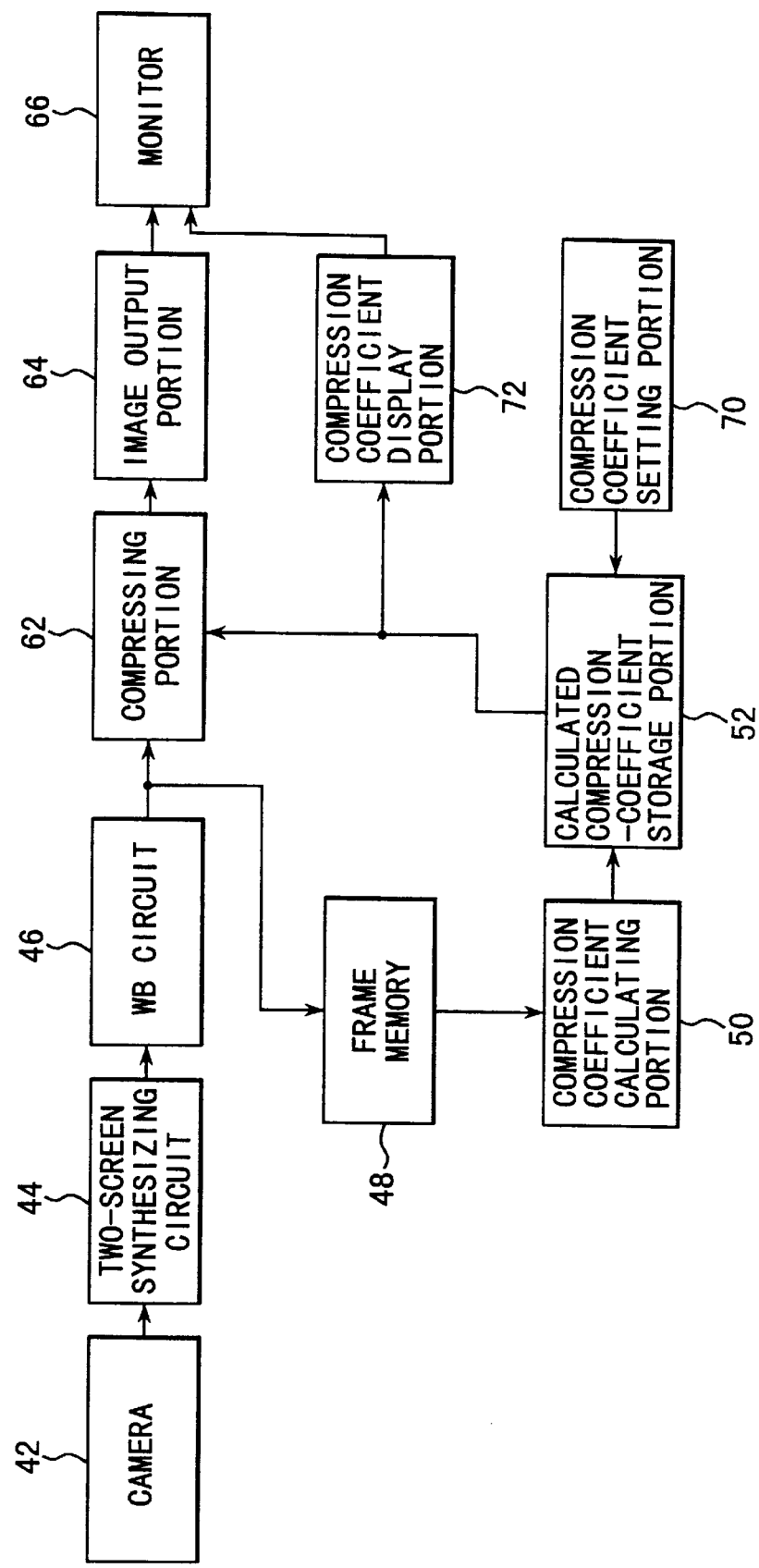
FIG. 19 is a block diagram showing the structure of an image processing apparatus according to a sixth embodiment of the present invention.

FIG. 19 is a block diagram showing the structure of an image processing apparatus according to the sixth embodiment of the present invention.

Referring to FIG. 19, the calculated compression-coefficient storage portion 52 is supplied with a compression coefficient calculated by the compression coefficient calculating portion 50 and an output from a compression-coefficient setting portion 70. An output from the calculated compression-coefficient storage portion 52 is transferred to the compressing portion 62 and a compression-coefficient display portion 72.

In the above-mentioned structure, the compression coefficient calculated by the compression coefficient calculating portion 50 is stored in the calculated compression-coefficient storage portion 52. The compression coefficient stored in the calculated compression-coefficient storage portion 52 is output to the compressing portion 62. In the compressing portion 62, image data subjected to the white balance process by the white balance circuit 46 is subjected to a compressing process with the compression coefficient output from the calculated compression-coefficient storage portion 52. Compressed image data is transferred to the image output portion 64 for outputting an image, and then displayed on the monitor 66.

The compression coefficient output from the calculated compression-coefficient storage portion 52 is also output to the compression-coefficient display portion 72. The compression-coefficient display portion 72 converts the output compression coefficient into a display form, such as numerals or a graph. The compression coefficient converted into the display form above is displayed on the monitor 66.

An operator makes a reference to the compressed image and data converted into the display form, such as the numeral or the graph and displayed on the monitor 66. If adjustment of the compression coefficient is determined to be required as a result of the reference, data of the compression coefficient is changed by the compression-coefficient setting portion 70. After the compression coefficient has been set by the compression-coefficient setting portion 70, the set compression coefficient is output to the calculated compression-coefficient storage portion 52. The calculated compression-coefficient storage portion 52 stores the compression coefficient output from the compression-coefficient setting portion 70. Then, the compression coefficient is output to the compressing portion 62.

As described above, according to the sixth embodiment, the compression coefficient obtained by the calculations can be confirmed by the operator. Moreover, the set compression coefficient can be reset. Therefore, if picked up and compressed image data is different from that required by the operator, it can be changed. Thus, an optimum image required by the operator can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:

an image pickup device;

detection means for detecting a level of an output signal from said image pickup device, and for detecting when a maximum value of the output signal from said image pickup device has reached a saturation level;

determining means for determining an adjustable first quantity of exposure of said image pickup device in accordance with an output from said detection means such that the maximum value of the output signal from said image pickup device does not exceed the saturation level; and synthesizing means for synthesizing a first image signal picked up by said image pickup device with said adjustable first quantity of exposure and at least one second image signal picked up with a predetermined second quantity of exposure which is larger than said adjustable first quantity of exposure.

2. An image pickup apparatus according to claim 1, wherein said determining means shortens the first quantity of exposure when said detection means detects that the maximum value of the output signal from said image pickup means has reached the saturation level, and said determining means lengthens the first quantity of exposure when the maximum value of the output signal from said image pickup device has not reached the saturation level.

3. An image pickup apparatus according to claim 1, further comprising synchronizing means for separating said first image signal and said second image signal from each other, for making timings of said first image signal and said second image signal coincide, and for outputting said first image signal and said second image signal to said synthesizing means.

4. An image pickup apparatus according to claim 1, wherein said second image signal comprises at least two image signals which have different quantities of exposure.

5. An image pickup apparatus according to claim 1, wherein said image pickup device is capable of non-destructively reading an image.

* * * * *